United States Patent [19]

Uchida et al.

[11] Patent Number: 4,884,648

[45] Date of Patent: Dec. 5, 1989

[54] VARIABLE ASSIST POWER STEERING SYSTEM WITH VARYING POWER ASSIST CHARACTERISTIC

[75] Inventors: Koh Uchida, Sagamihara; Takashi Kurihara, Atsugi; Makoto Miyoshi, Kawasaki, all of Japan

[73] Assignee: Nissan Motor Company, Limited, Yokohama, Japan

[21] Appl. No.: 138,480

[22] Filed: Dec. 28, 1987

[30] Foreign Application Priority Data

Dec. 27, 1986 [JP] Japan .......................... 61-313519

[51] Int. Cl.⁴ ..................... B62D 5/083; B62D 6/02
[52] U.S. Cl. ..................... 180/142; 60/494; 137/625.29; 180/143
[58] Field of Search .................. 180/141–143, 180/132, 146, 149; 60/325, 459, 464, 494; 251/129.01, 304; 91/375 R; 137/47, 51, 569, 625.21, 625.23, 625.24, 625.28, 625.29, 625.31

[56] References Cited

U.S. PATENT DOCUMENTS

| | | | |
|---|---|---|---|
| 4,465,098 | 8/1984 | Bacardit | 137/625.21 |
| 4,512,238 | 4/1985 | Bacardit | 91/370 |
| 4,561,516 | 12/1985 | Biship et al. | 180/142 |
| 4,561,521 | 12/1985 | Duffy | 180/142 |
| 4,565,115 | 1/1986 | Bacardit | 91/375 A |
| 4,570,735 | 2/1986 | Duffy | 180/142 |
| 4,619,339 | 10/1986 | Futaba et al. | 180/143 |
| 4,632,204 | 12/1986 | Honaga et al. | 180/142 |
| 4,669,568 | 6/1987 | Kervagoret | 180/142 |
| 4,672,885 | 6/1987 | Kervagoret | 91/450 |

FOREIGN PATENT DOCUMENTS

| | | | |
|---|---|---|---|
| 0041887 | 12/1981 | European Pat. Off. | |
| 53560 | 6/1982 | European Pat. Off. | 180/132 |
| 0072731 A2 | 8/1982 | European Pat. Off. | |
| 2568843 | 2/1986 | France | |
| 47-30039 | 11/1972 | Japan | |
| 54-15232 | 2/1979 | Japan | |
| 56-38430 | 9/1981 | Japan | |
| 56-174363 | 12/1981 | Japan | |
| 57-30663 | 2/1982 | Japan | |
| 58-156459 | 9/1983 | Japan | |
| 161667 | 9/1983 | Japan | 180/142 |
| 1073 | 1/1985 | Japan | 180/142 |
| 61-43229 | 9/1986 | Japan | |
| 257365 | 11/1986 | Japan | 180/141 |

*Primary Examiner*—John A. Pekar
*Attorney, Agent, or Firm*—Foley & Lardner, Schwartz, Jeffery, Schwaab, Mack, Blumenthal & Evans

[57] ABSTRACT

A variable assist power steering system comprises a control valve including valve elements relatively displaceable in response to a steering torque to define therebetween two parallel fluid flow paths connected between the fluid source (10) and the fluid reservoir to produce pressure difference in the power cylinder in response to the steering torque. The control valve includes a plurality of bypass paths, each arranged in parallel to one of plurality of serially arranged variable flow orifices forming the two flow paths and each provided with an externally controlled variable flow orifice valve which is operable responsive to a vehicle speed.

4 Claims, 8 Drawing Sheets

VARIABLE ASSIST POWER STEERING SYSTEM WITH VARYING POWER ASSIST CHARACTERISTIC

RELATED APPLICATIONS

The following two U.S. patent applications have been already filed and assigned to the same assignee of the present application.

(1) U.S. patent application Ser. No. 044,065, filed on Apr. 29, 1987, now pending, (2) U.S. patent application Ser. No. 102,412, filed on Sept. 29, 1987, now U.S. Pat. No. 4,771,841

The following four U.S. Patent Applications have been concurrently filed and assigned to the same assignee of the present application.

(3) U.S. pat. application Ser. No. 07/138,345 filed on Dec. 28, 1987; claiming priority based on Japanese Patent Application No. 61-313517 with a filing date of Dec. 27, 1986, (4) U.S. patent application Ser. No. 07/138,490 filed on Dec. 28, 1987; claiming priority based on Japanese Patent Application No. 61-313521 with a filing date of Dec. 27, 1986, (5) U.S. patent application Ser. No. 07/138,402 filed on Dec. 28, 1987; claiming priority based on Japanese Patent Application No. 61-313520 with a filing date of Dec. 27, 1986, (6) U.S. patent application Ser. No. 07/138,497 filed on Dec. 28, 1987; claiming priority based on Japanese Patent Application No. 61-313518 with a filing date of December 27, 1986,

BACKGROUND OF THE INVENTION

The present invention relates to a variable assist power steering system for vehicles and more particularly to a hydraulic control valve for use in a variable assist power steering system where it is desirable to have the degree of power assistance change with vehicle speed or some other variable related to the mode of operation of the vehicle.

A power assisted steering system can be characterized as operating under three driving conditions. Firstly during straight ahead driving at medium to high speeds, the power requirements on the steering system are extremely low and the degree of power assistance provided by the steering gear should correspondingly minimized to permit the feedback of road "feel" from the tires to the driver. Secondary during medium and high speed passing and cornering maneuvers, a progressive increase in the level of power assistance with driver input torque is desirable. Nevertheless moderate driver input torques should still be maintained in order that the driver can feel adequately the dynamic state of the vehicle. Thirdly, and lastly, during low speed or parking maneuvers, the power requirements on the steering system may be large and fidelity of the steering system in terms of transmitting road feel is of little importance. Under these circumstances it is generally desirable to offer large degrees of power assistance, thereby minimizing the input torque required to be furnished by the driver.

The demands for optimum valve characteristics during the above three driving conditions conflict. Attempts have been made in the past to avoid the conflicting demands of the first and third driving conditions, namely the need to achieve a low level assistance for high to medium speed on-center driving while having high levels of assistance for low speed and parking maneuvers, by exploiting the fact that, for most valves, the degree of assistance varies with the flow of oil. For example, in one such widely used system, the power steering pump is caused to reduce the flow of oil as vehicle speed increases. However, this adversely affects valve performance in the second driving condition above, namely medium to high speed passing and cornering maneuvers, where progressive valve response is impaired due to the low oil flow. Also, in the event that such a steering maneuver requires rapid turning of the steering wheel, the lower pump flow may be inadequate, rendering the power assistance momentarily inoperative. In another known system disclosed in JP 56-38430 B2, a bypass path with a variable flow valve is connected between both ends of the power cylinder and the variable flow valve is controlled in response to vehicle speed to cause bypass flow to increase as vehicle speed increases. However, this adversely affects valve performance in the second driving condition above, namely medium to high speed passing and cornering maneuvers, where progressive valve response is impaired due to the low gain.

The most satisfactory method of matching valve performance in all three of the abovementioned conditions is modulating the valve characteristic with vehicle speed A system which provides for better modulation of power assistance with vehicle speed is disclosed in U.S. Pat. No. 4,561,521 and can be seen to employ a rotary valve with primary and secondary valve portions. A speed sensitive valve is used to control oil flow from the pump to the secondary valve portion so that at high vehicle speeds a parallel flow path is provided between the rotary valve and the pump as oil is distributed to both primary and secondary valve portions. At low vehicle speeds, the speed sensitive valve restricts the flow of oil from the pump to the secondary valve portion. During parking maneuvers, the primary valve portion acts alone in the normal manner and the secondary valve portion is vented and not fed with oil from the pump. A change from a high level of power assist to a low level of power assist, and conversely, is effected by a variable force solenoid which is used to establish a parallel flow path from the pump to the secondary valve portion through a variable flow orifice. A speed sensing module controls the solenoid to open and close a variable orifice valve thus providing gradual changes in the level of power assist as the vehicle speed changes The rotary valve used in this power steering system includes a valve housing having a circular opening which receives a valve sleeve. Positioned within the valve sleeve is an inner valve. The inner valve is formed with a primary set of longitudinal grooves forming a primary valve section, and also with a secondary set of longitudinal grooves forming a secondary valve section. The primary and secondary sets of longitudinal grooves register with primary and secondary sets of internal grooves formed in the internal wall of the valve sleeve, respectively. The primary and secondary sets of internal grooves are difficult to machine and require skilled labor because they have to be formed in the cylindrical internal wall of the valve sleeve with high precision. This has caused increased production steps and manufacturing cost.

SUMMARY OF THE INVENTION

The object of the present invention is to improve a variable assist power steering system which is free from the problem above.

The specific object of the present invention is to provide a hydraulic fluid circuit for a variable assist power steering system which can be embodied with valve grooves easy to machine.

Another object of the present invention is to provide a hydraulic fluid circuit for a variable assist power steering system which has varying power assist characteristics with vehicle speed or some other variable related to mode of operation of the vehicle.

According to the present invention, instead of varying the rate of fluid flow passing trough two flow paths connected between the fluid source and fluid reservoir to alter power assist with vehicle speed, the effective flow areas of the two flow paths at portions upstream of ports connected to a power cylinder and/or downstream of the ports are varied to alter power assist with vehicle speed or some other variable related to the mode of operation of the vehicle.

In one form of the present invention, a plurality of variable flow orifices are provided in series in each of the two flow paths at the portion downstream of the ports connected to the power cylinder, and each of the plurality of variable flow orifices is bypassed by an externally controlled variable flow orifice valve. The externally controlled variable flow orifice valves are alternatively opened to bypass the associated variable flow orifice as the vehicle speed or the variable related to mode of operation of the vehicle varies. More specifically, two variable flow orifices are provided at the downstream portion of each of the two flow paths, and two externally controlled variable flow orifice valves are connected across the two variable flow orifices, respectively, in parallel thereto. Both of the two variable flow orifice valves are substantially closed at low vehicle speeds, one of them is opened during high vehicle speeds with the other one kept closed, and the one is closed and the other one is opened during medium vehicle speeds.

In another form of the present invention, two variable flow orifices are provided in series in each of the downstream portions of the two flow paths, and two externally controlled variable orifice valves are provided, one externally controlled variable flow orifice valve being connected across one of the two variable flow orifices, the other externally controlled variable flow orifice valve has one end connected between the two variable flow orifices of one of the two flow paths and an opposite end connected between the two variable flow orifices of the other flow path.

In still another form of the present invention, three variable flow orifices are provided in series in each of the downstream or upstream portions of the two flow paths, and three externally controlled variable flow orifice valves are provided. The first one of the three variable flow orifices can be bypassed by the first one of the three externally controlled variable flow orifice valve, the second one of the three variable flow orifices can be bypassed by the second one of the three externally controlled variable flow orifices, and the third one of the three variable flow orifices can be bypassed by the third one of the three externally controlled variable flow orifices The three externally controlled variable flow orifice valves are opened or closed in a predetermined manner as the vehicle speed or the variable related to mode of operation of the vehicle varies.

DETAILED DESCRIPTION OF THE INVENTION

Figure 1:
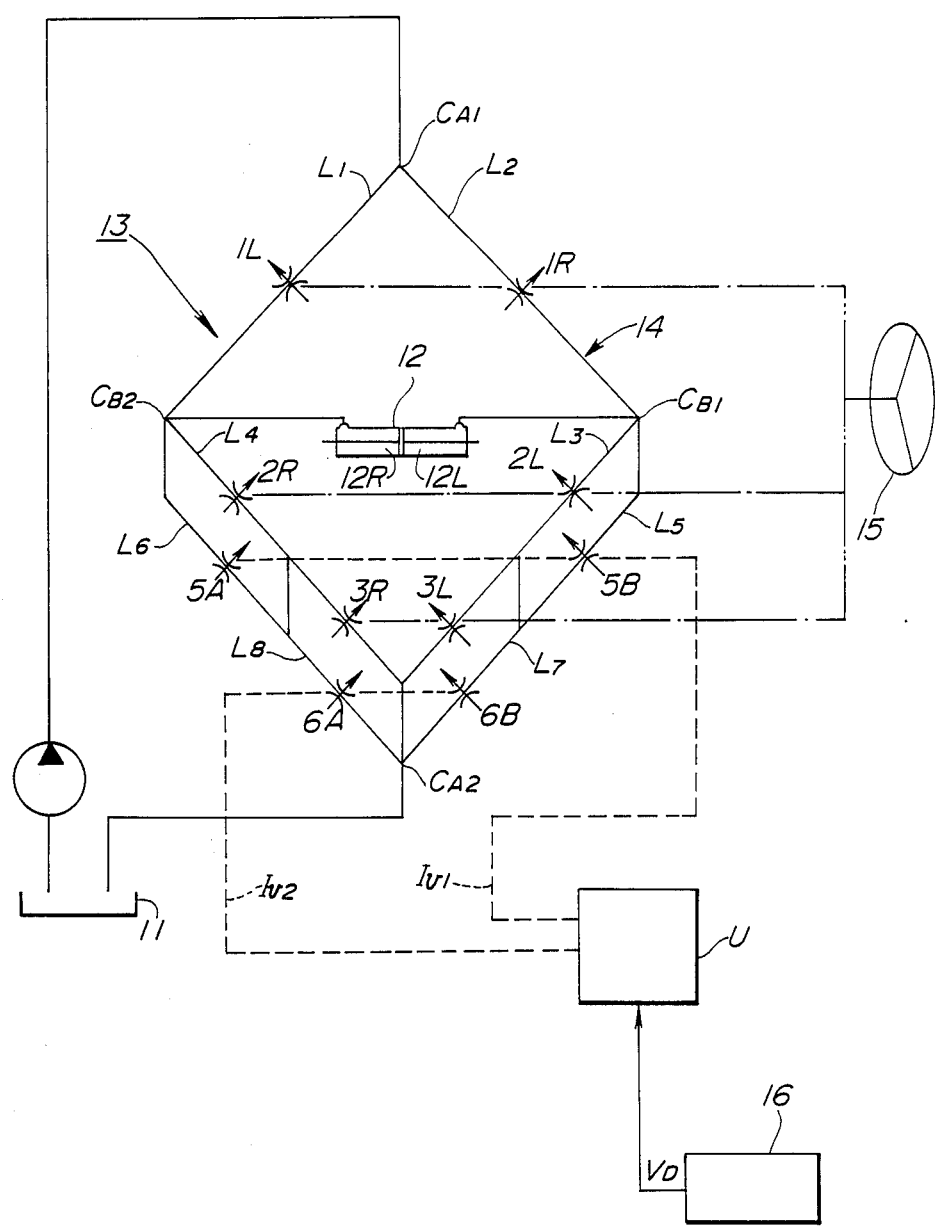
FIG. 1 is a circuit diagram of a first embodiment of the present invention.

FIG. 1 shows a hydraulic fluid circuit diagram which includes an oil pump 10 as a hydraulic fluid source, a tank 11 as a fluid reservoir, and a control valve 13 employing a fluid flow distributor circuit 14 of the open center type. Also shown are a steering wheel 15, a vehicle speed sensor 16, and a control unit U.

In the conventional manner, the fluid flow distributor circuit 14 includes two parallel flow paths $L_2$–$L_3$ and $L_1L_4$ connected between a pump fluid supply port $C_{A1}$ and a fluid return port $C_{A2}$. The flow path $L_2$–$L_3$ has a cylinder connection port $C_{B1}$ connected to a cylinder chamber 12L of a power cylinder 12, while the other flow path $L_1$–$L_4$ has a cylinder connection port $C_{B2}$ connected to a cylinder chamber 12R of the power cylinder 12. The upstream flow path portion $L_2$ is provided with a variable flow orifice 1R, and the downstream flow path portion $L_3$ is provided with two serial variable flow orifices 2L and 3L. Similarly, the upstream flow path portion $L_1$ is provided with a variable flow orifice 1L, and the downstream flow path portion $L_4$ is provided with two serial variable flow orifices 2R and 3R. These variable flow orifices 1R, 2L, 3L, 1L, 2R, and 3R are operatively associated with the steering wheel 15 such that when the steering wheel 15 is in the central rest position, they are opened to provide unrestricted and balanced parallel flows of fluid between the fluid supply port $C_{A1}$ and the fluid return port $C_{A2}$. Turning the steering wheel 15 clockwise from the central rest position causes the variable flow orifices 1R, 2R and 3R to decrease their orifice areas as steering torque increases with the other three variable flow orifices 1L, 2L, and 3L opening proportionally and simultaneously, and turning the steering wheel 15 counterclockwise from the central rest position causes the variable flow orifices 1L, 2L and 3L to decrease their orifice areas as steering torque increases with the other three variable flow orifices 1R, 2R, and 3R opening proportionally and simultaneously.

In order to modulate valve characteristic determined by the above-mentioned variable flow orifices, there are provided four bypass paths $L_5$, $L_7$, $L_6$ and $L_8$ as arranged in parallel to the variable flow orifices 2L, 3L, 2R and 3R, respectively. Among them, the bypass paths $L_5$ and $L_6$ are provided with externally controlled variable flow orifice valves 5B and 5A, respectively, which have an orifice area variable with a predetermined variable or parameter related to operating conditions of the vehicle except the steering torque. The other two bypass paths $L_7$ and $L_8$ are provided with externally controlled variable flow orifices 6B and 6A, respectively, which have an orifice area variable with the above-mentioned predetermined variable. In this embodiment, a vehicle speed is used as such a variable.

Figure 2A:
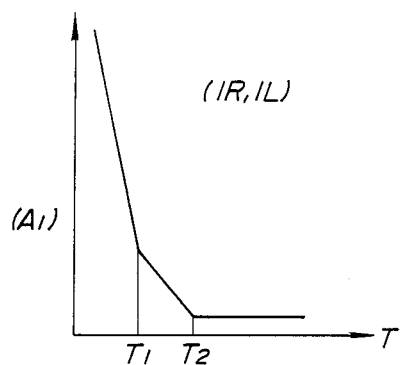
FIGS. 2(a), 2(b), and 2(c) are diagrammatic chart showing how orifice areas of variable flow orifices vary against a steering input torque (T)
Figure 2B:
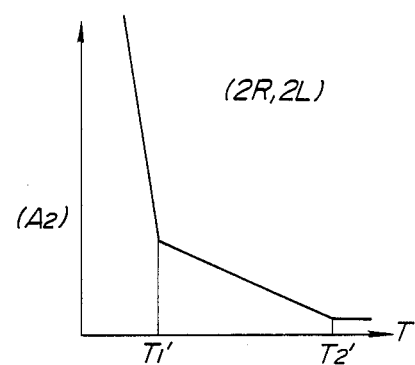

Referring to FIGS. 2(a) to 2(e), FIG. 2(a) shows how the orifice are ($A_1$) of the variable flow orifice 1R or 1L decreases as the steering torque (T) increases. FIG. 2(b) shows how the orifice area ($A_2$) of the variable flow orifice 2R or 2L decrease as the steering torque T increases.

Figure 2C:
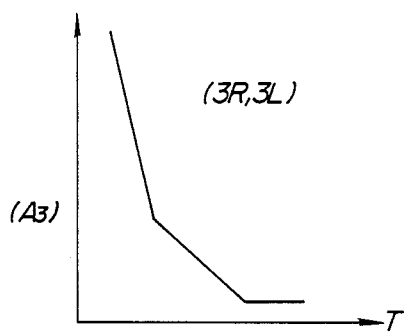
Figure 2D:
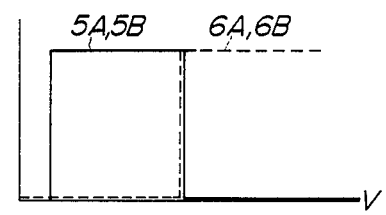
FIGS. 2(d) and 2(e) are diagrammatic charts showing how orifice area of externally controlled variable flow orifice valves vary against vehicle speed (V)
Figure 2F:
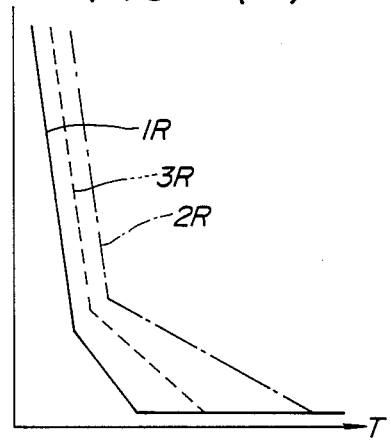
FIG. 2(f) is a chart combining all of the charts shown in FIGS. 2(a), 2(b) and 2(c).
Figure 2E:
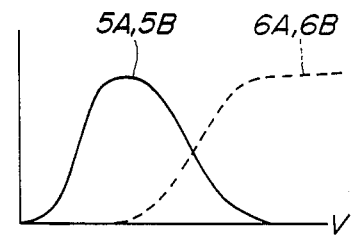

FIG. 2(c) shows how the orifice area ($A_3$) of the variable flow orifice 3R or 3L decreases as the steering torque increases. Lastly, FIG. 2(d) shows how the orifice area of the externally controlled variable flow orifice valves 5A and 5B and the orifice area of the externally controlled variable orifice valves 6A and 6B change against variation of vehicle speed V. As will be appreciated from this figure, all of the orifice valves 5A, 5B, 6A, and 6B are fully closed at low vehicle speeds, the orifice valves 5A and 5B are fully opened with the other orifice valves 6A and 6B remaining closed at medium speeds, and the orifice valves 5A and 5B are fully closed and the other orifice valves 6A and 6B are fully opened at high vehicle speeds. In this embodiment, these variable flow orifice valves are operated by solenoid actuators, respectively, which are electrically connected to the control unit U. The control unit U receives the output signal $V_D$ indicative of the vehicle speed detected by the vehicle speed sensor 16 and supplies electric current $I_{v1}$ to the solenoid actuator for the orifice valves 5B and 5A in response to medium vehicle speeds or supplies electric current $I_{v2}$ to the solenoid actuator for the orifice valves 6B and 6A in response to high vehicle speeds. In the case of FIG. 2(d), the orifice areas of the valves 5A, 5B and 6A are subject to a step-like change. Alternatively, if desired, they may be varied in a gradual manner as shown in FIG. 2(e). Referring to FIG. 2(f), characteristic curves shown in FIGS. 2(a), 2(b) and 2(c), respectively, are shown in a single graph for ease of comparison.

Figure 3:
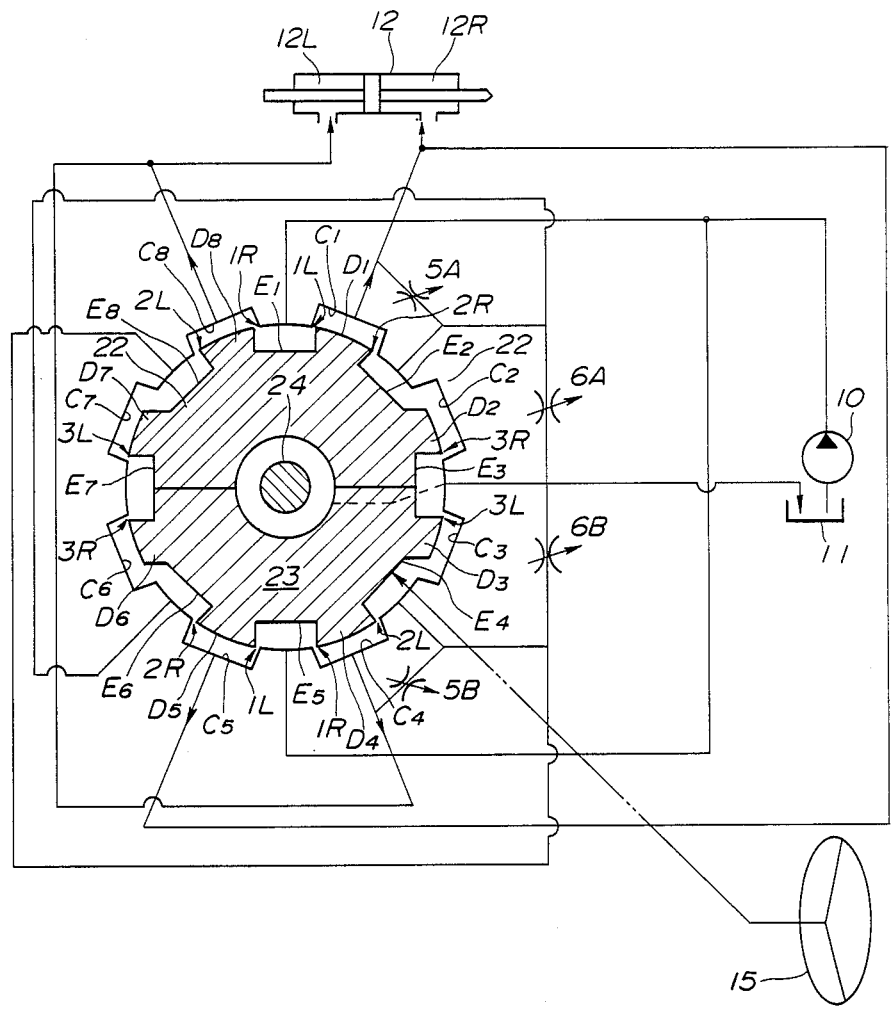
FIG. 3 is a diagram showing the fluid flow distributor circuit being defined between two relatively displaceable valve elements.

Referring to FIG. 3, it will be explained how the fluid flow distributor circuit 14 is defined between two relatively displaceable valve elements, namely a valve sleeve 22 and an inner valve 23, of a rotary control valve 20 of the conventional type including a torsion bar 24.

As will be understood from FIG. 3, formed in the cylindrical inner wall of the valve sleeve 22 are eight longitudinally extending blind ended inner grooves $C_1$, $C_2$, $C_3$, $C_4$, $C_5$, $C_6$, $C_7$ and $C_8$ which are angularly spaced one after another and separated by lands $D_1$ to $D_8$ Among them, a pair of diametrically opposed grooves $C_1$ and $C_5$ are connected to a cylinder chamber 12R of a power cylinder 12, while another pair of diametrically opposed grooves $C_8$ and $C_4$ are connected to a cylinder chamber 12L of the power cylinder 12.

Formed in the outer peripheral wall of the inner valve 23 are eight longitudinally extending blind ended grooves $E_1$ to $E_8$. Among them, two grooves $E_3$ and $E_7$ are connected via radial passages and an axial bore to a fluid reservoir 11, while another two main grooves $E_1$ and $E_5$ face ports opening at the opposite lands of the valve sleeve 22, respectively, which ports are connected to a pump 10 I the central rest position as illustrated in FIG. 3, the groove $E_1$ overlaps the adjacent two inner grooves $C_8$ and $C_1$, the groove $E_2$ overlaps the adjacent two inner grooves $C_1$ and $C_2$, the groove $E_3$ overlaps the adjacent two inner grooves $C_2$ and $C_3$, the groove $E_4$ overlaps the adjacent two inner grooves $C_3$ and $C_4$, the groove $E_5$ overlaps the adjacent two inner grooves $C_4$ and $C_5$, the groove $E_6$ overlaps the adjacent two inner grooves $C_5$ and $C_6$, and the groove $E_7$ overlaps the adjacent two inner grooves $G_6$ and $C_7$, and the groove $E_8$ overlaps the adjacent two inner grooves $C_7$ and $C_8$. Thus, when the rotary valve 20 in the central rest position as illustrated in FIG. 3, unrestricted balanced flow of fluid between the fluid supply grooves $E_1$, $E_5$ and the drain grooves $E_3$, $E_7$ is provided.

It will now be explained how the variable flow orifices 1R, 1L, 2R, 2L, 3R, and 3L are formed during relative displacement of the inner valve 23 with regard to the valve sleeve 22. In this case two sets of such variable flow orifices are formed. Two variable flow orifices 1R are formed between the mating edges of the grooves $E_1$ and $C_8$ and between the mating edges of the grooves $E_5$ and $C_4$, respectively. The two variable flow orifices 1L are formed between the mating edges of the grooves $E_1$ and the inner groove $C_2$ and between the mating edges of the grooves $E_5$ and the inner groove $C_5$. The two variable flow orifices 2R are formed between the mating edges of the grooves $E_2$ and the inner groove $C_1$ and between the mating edges of the grooves $E_6$ and $C_5$. The two variable flow orifices 2L are formed between the mating edges of the grooves $E_8$ and $C_8$ an the mating edges of the grooves $E_4$ and $C_4$. The two variable flow orifices 3R are formed between the mating edges of the grooves $E_3$ and $C_2$ and between the mating edges of the grooves $E_7$ and $C_6$. Lastly, the two variable flow orifices 3L are formed between the mating edges of the grooves $E_3$ and $C_3$ and between the mating edges of the grooves $E_7$ and $C_7$.

In FIGS. 3, the rotary valve 20 is illustrated in its central rest position. Under this condition, assuming that the externally controlled variable flow orifice valves 4A and 4B are fully closed when the vehicle speed is zero or substantially zero, fluid under pressure from the pump 10 is divided evenly through the variable flow orifices 1R, 21 and 3L in one direction and through the variable flow orifices 1L, 2R and 3R in the opposite direction. The pressure drops at the level of flow restrictions provided by these orifices are, under this condition, substantially nil The rotary valve thus has no effect on the power cylinder 12 and thus no effect on the steering system.

In the central rest position, assuming that the externally controlled variable flow orifice valves 4A and 4B are fully opened in response to a high vehicle speed. In this case, since the variable flow orifice valves5A and 5B are fully closed and the variable valves flow orifice valves 6A and 6B are fully opened, the flow of fluid past through the orifices 1R and 2L splits into two, one passing through orifice 3L, the other passing through the bypass path $L_7$, while, the flow of fluid past through the orifices 1L and 2R splits into two, one passing through the orifice 3R, the other passing through the bypass path $L_8$. At medium vehicle speeds, since the variable flow orifice valves 5A, 5B are fully opened with the other variable flow orifice valves 6A, 6B fully closed, there are bypass flows through the bypass path $L_5$ and through the bypass path $L_6$. Although bypass paths are selectively opened as vehicle speed varies, the flows of fluid passing through these paths are balanced so that the power cylinder 12 is not affected.

Figure 4:
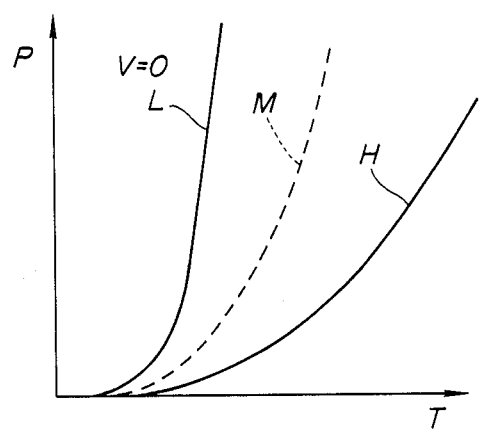
FIG. 4 is a chart showing power assist vs., steering torque characteristic curves for low, high and medium vehicle speeds.

In turning the steering wheel 15 at zero or low vehicle speeds, there is accordingly a relative displacement of the inner valve 23 with respect to the valve sleeve 22. In the case of a displacement of the inner valve 23 in a clockwise direction in FIG. 3, the variable flow orifices 1R, 2R and 3R decrease orifice areas and effect a throttling of the fluid path, inducing a pressure drop which in turn results in a pressure increase in the right cylinder chamber 12R of the power cylinder 12. Curve L in FIG. 4 shows power assist vs. steering torque characteristics at vehicle speed zero.

Let us now consider how the rotary valve 20 works at high vehicle speeds. In this case, the variable flow orifice valves 6A and 6B are fully opened with the other variable flow orifice valves 5A and 5B fully closed. If the steering wheel 15 is turned clockwise during operation of the vehicle at such high vehicle speed and there is accordingly a displacement of the inner valve 23 in a clockwise direction in FIG. 3, the variable flow orifices 1R, 2R and 3R decrease their orifice areas as shown in FIGS. 2(a), 2(b) and 2(c). In this case, there are formed fluid flows bypassing the orifice 3R via the bypass path $L_8$ (see FIG. 1) so that there is a decrease in flow of fluid directed to the cylinder chamber 12R resulting in a less pressure increase in the cylinder chamber 12R of the power cylinder 12. The cylinder chamber 12L is in direct communication with the fluid reservoir 11. It will be understood that, under this condition, the variable flow orifice 1R and 2R cooperate characteristics to have effect on the pressure increase in the cylinder chamber 12R and the variable flow orifice 3R has no effect thereon. The increase of pressure P (i.e., a power assist) against steering torque T at high vehicle speed is illustrated by a characteristic curve H in FIG. 4. As will be readily seen from FIG. 2(f), as steering torque T increases, the orifice area $A_2$ of the variable flow orifice 2R decreases at a rate less than a rate at which the orifice area $A_2$ decreases, and after the steering torque T has increased beyond a predetermined value $T_1'$, the orifice area $A_2$ decreases at a further less rate. The shape of the characteristic curve H is determined mainly by the variable flow orifice 2R. Thus, any desired high vehicle speed power assist characteristic may be obtained by suitably designing the orifice varying characteristics of the variable flow orifice 2R.

In turning the steering wheel 15 during operation of the vehicle at medium speeds, the variable flow orifice valves 5A nd 5B are fully opened and the other variable flow orifice valves 6A and 6B fully closed. The manner of modulation of a pressure increase in the cylinder chamber 12R of the power cylinder 12 is determined by the variable flow orifice 1R and the variable flow orifice 3R since the other variable flow orifice 2R is bypassed by the bypass path $L_6$ and thus has not effect on the pressure increase in the cylinder chamber 12R of the power cylinder 12. This is represented by a characteristic curve M shown in FIG. 4.

Figure 5:
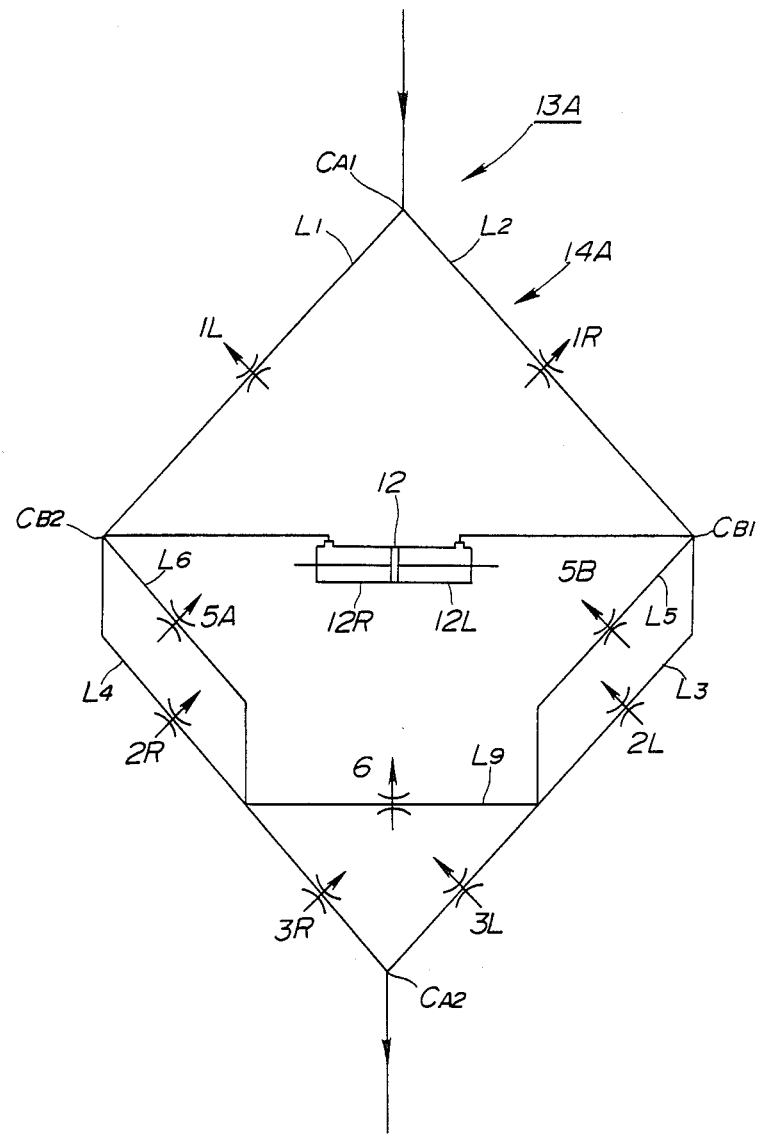
FIG. 5 is a circuit diagram showing a second embodiment.

Referring to FIG. 5, a second embodiment of a control valve 13A with a fluid distributor circuit 14A is described. This embodiment is substantially the same as the first embodiment except for the fact that two bypass paths $L_7$ and $L_8$ have been replaced with a single bypass path $L_9$ provided with a single variable flow orifice valve 6. The variable flow orifice valve 6 has the same characteristics as those of the orifice valve 6A or 6B. The bypass path $L_9$ has one end connected to the fluid path $L_3$ at an intermediate point between the variable flow orifices 2L and 3L and an opposite end connected to the fluid path $L_4$ at an intermediate point between the variable flow orifices 2R and 3R.

In the previous embodiments, two variable flow orifices are arranged in series in one fluid path portion of a fluid distributor circuit and they are selectively bypassed to provide three different valve characteristics at three different stages with regard to vehicle speed. In the following two embodiments, three variable flow orifices are arranged in series in each of two parallel fluid path portions and they are bypassed selectively, thereby to provide four different valve characteristics at four different stages with regard to vehicle speed.

Figure 6:
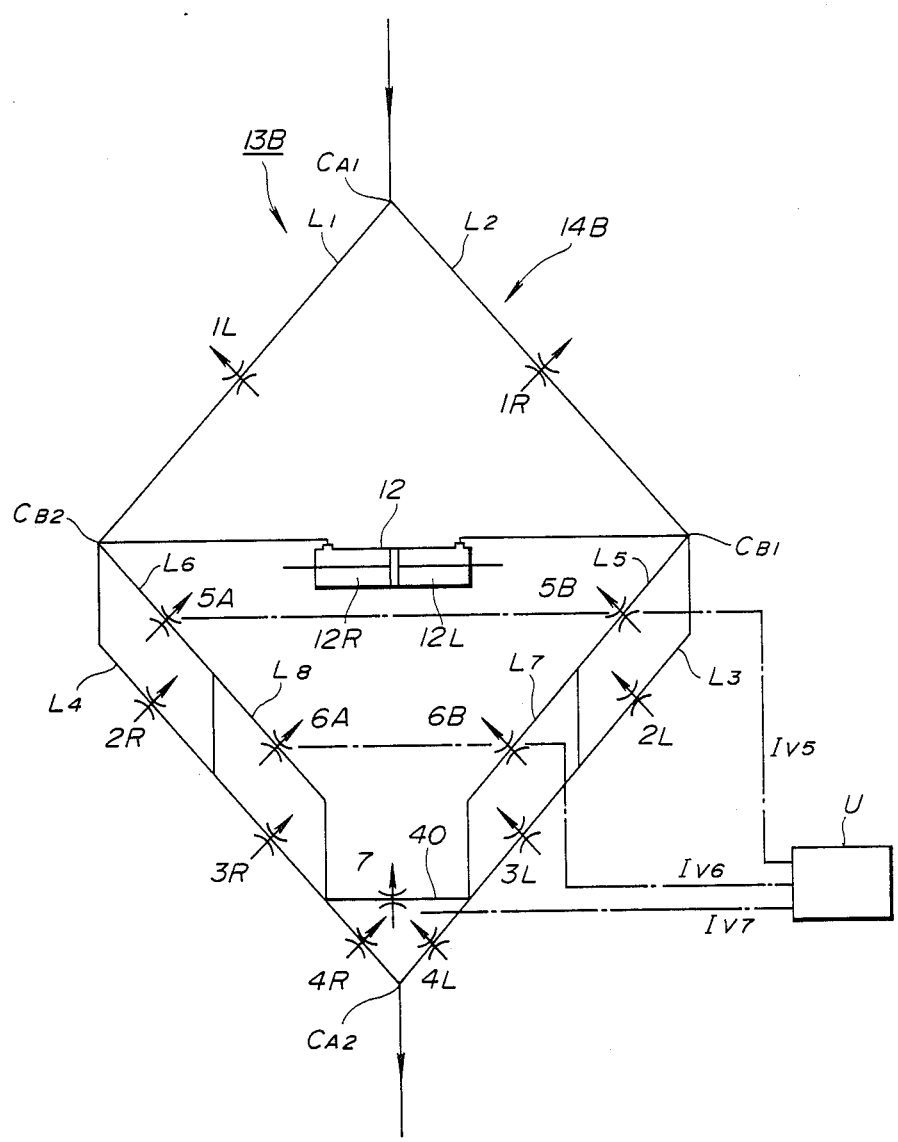
FIG. 6 is a circuit diagram showing a third embodiment.
Figure 7:
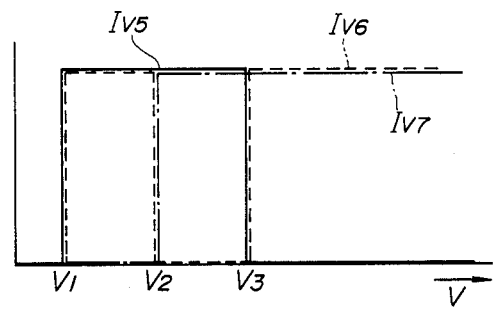
FIGS. 7 and 8 show two examples of control of solenoid actuators of externally controlled variable flow orifice valves against vehicle speed.
Figure 8:
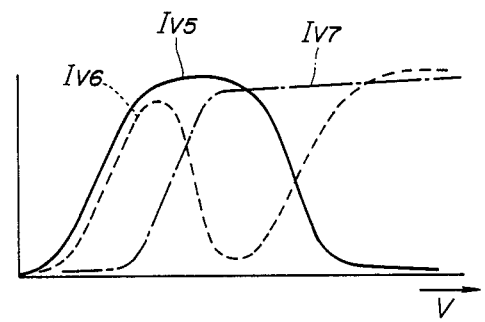

Referring to FIG. 6, a third embodiment of a control valve 13B employing a fluid distributor circuit 14B includes three serial variable flow orifices 2L, 3L and 4L arranged in a downstream fluid flow path portion $L_3$ and another three serial variable flow orifices 2R, 3R and 4R arranged in a downstream fluid flow path portion $L_4$. Arranged in parallel to the variable flow orifices 2L and 2R are bypass paths $L_5$ and $L_4$ which are provided with vehicle speed controlled variable flow orifice valves 5B and 5A, respectively. Arranged in parallel to the variable flow orifices 3L and 3R are bypass paths L7 and L8 which are provided with vehicle speed controlled variable flow orifice valves 6B and 6A. The remaining two variable flow orifices 4R and 4L can be bypassed by a common bypass path 40 provided with a vehicle speed controlled variable flow orifice valve 7. FIGS. 7 and 8 show two examples of varying electric currents $I_{v5}$, $Iv_6$, $Iv_7$ against variation of vehicle speed V. For example, referring to FIG. 7, at a vehicle speed lower than a value $V_1$, all of the bypass paths $L_5$ to $L_8$ and 40 are closed, so that three serial variable flow orifices 2L, 3L and 4L or 2R, 3R, and 4R determine valve characteristics. At a vehicle speed between $V_1$ and $V_2$, the bypass paths $L_5$ and $L_6$, and $L_7$ and $L_8$ are fully opened, so that the variable flow orifice 4L and 4R determine the valve characteristics. At a vehicle speed between $V_2$ and $V_3$, the by pass path 40 only is opened, so that serial variable flow orifices 2L and 3L and 2R and 3R determine the valve characteristics. At a vehicle speed higher than $V_3$, the bypass paths 40 and the bypass paths $L_7$ and $L_8$ are opened, so that the variable flow orifices 2L and 2R determine the valve characteristics.

Figure 9:
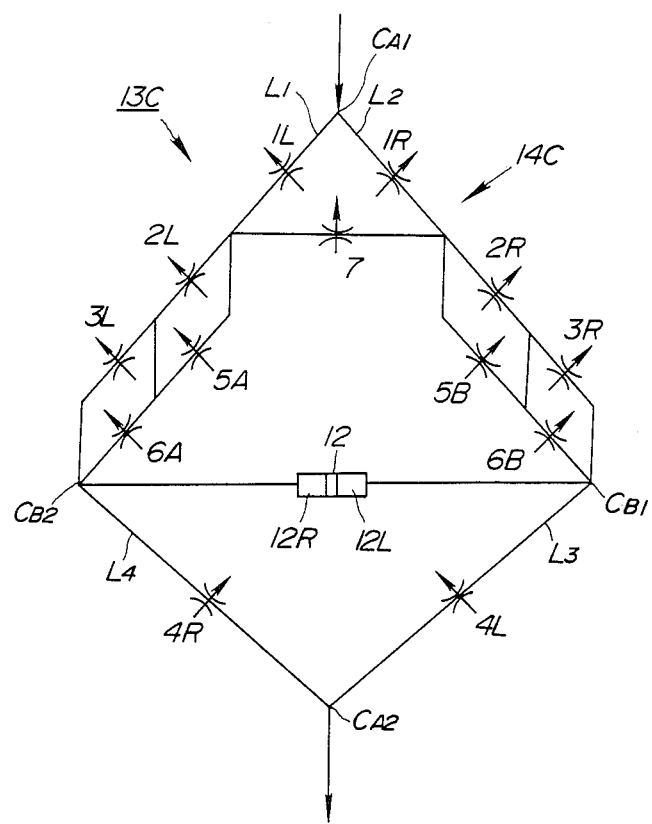
FIG. 9 is a circuit diagram showing a fourth embodiment.

FIG. 9 shows a fourth embodiment of a control valve 13C using a fluid distributor circuit 14C. This embodiment is substantially the same as the third embodiment the arrangement of three serial variable flow orifices and their associated bypass paths.

In the previously described examples, vehicle speed is detected and used as a variable on which the control unit U controls electric current passing through the solenoid operated actuator for the externally controlled variable flow orifice valves 4A and 4B. More particularly, the externally controlled variable flow orifice valves 4A and 4B open simultaneously proportionally as vehicle speed increases.

If desired, the externally controlled orifice valve 4 may be controlled in response to some other variable related to a driver's preference or mode of operation of the vehicle. For this end, a manually operable selector is disposed near the vehicle driver's seat and a control unit is supplied with the output of the manual selector such that the driver can vary electric current passing through a solenoid actuator for an externally controlled variable orifice valve 4 until the level of a power assist fits his/her preference.

Some other variable related to a road friction coefficient may be used for controlling orifice area of the externally controlled variable flow orifice valve 4. One example of a sensor to detect such variable is a switch coupled to a vehicle's wiper switch. In this case, the solenoid current increases as wiper speed increases, thus decreasing the level of power assist in response to wiper speed. This is advantageous because it is the common behaviour of a vehicle's driver to increase the wiper speed as rain fall gets heavier. A rain drop sensor may be used as a road friction coefficient sensor. It is possible to detect road friction coefficient by computing a difference in rotation between a traction road wheel and a non-traction road wheel or directly detect road friction coefficient by detecting the amount of splash by a traction road wheel. In using the variable related to the road friction coefficient, it is also possible to modify the solenoid current that is determined based on vehicle speed in response to the friction coefficient.

The solenoid current may be varied to modify the orifice area vs., vehicle speed characteristics shown in FIG. 2(d) in response to frequency of acceleration and deceleration which the vehicle is subject to. The solenoid current may be varied in accordance with judgement made based on steering wheel angle and speed at which the steering wheel is turned. Lastly, the solenoid current may be varied in response to load imposed on the vehicle dirigible road wheels.

What is claimed is:

1. A variable assist power steering system for vehicles including a hydraulic fluid source, a fluid reservoir, and a hydraulic pressure operated power cylinder adapted to be connected to a steering linkage, comprising:
   a control valve including valve elements relatively displaceable in response to a first predetermined variable to define therebetween two parallel fluid flow paths connected between the fluid source and the fluid reservoir to produce a pressure difference in the power cylinder in response to said first predetermined variable; wherein
   each of said plurality of parallel fluid flow paths are connected to the power cylinder and divided into an upstream portion fluidly disposed between the hydraulic fluid source and the power cylinder and a downstream portion fluidly disposed between the power cylinder and the fluid reservoir,
   said valve elements define a plurality of main variable flow orifices serially arranged in at least one of said upstream and downstream portions of each of said two parallel fluid flow paths
   said control valve comprises a plurality of bypass paths connected in parallel to said plurality of main variable flow orifices, respectively, each of said plurality of bypass paths including an externally controlled variable flow orifice valve which has an orifice area which is variable in response to a second predetermined variable different from said first predetermined variable.

2. A variable assist power steering system as claimed in claim 1, wherein said second predetermined variable is a vehicle speed.

3. A variable assist power steering system as claimed in claim 1, wherein said first predetermined variable is a steering torque.

4. A variable assist power steering system for vehicles including a hydraulic fluid source, a fluid reservoir, and a hydraulic pressure operated power cylinder adapted to be connected to a steering linkage, comprising:
   a control valve including valve elements relatively displaceable in response to a first predetermined variable to define therebetween two parallel fluid flow paths connected between the fluid source and the fluid reservoir to produce a pressure difference in the power cylinder in response to said first predetermined variable,
   each of said plurality of parallel fluid flow paths being connected to the power cylinder and divided into an upstream portion fluidly disposed between the hydraulic fluid source and the power cylinder and a downstream portion fluidly disposed between the power cylinder and the fluid reservoir,
   said valve elements defining a plurality of main variable flow orifices serially arranged in at least one of said upstream and down stream portions of each of said two parallel fluid flow paths;
   means for defining a plurality of bypass paths connected in parallel to said plurality of main variable flow orifices, respectively, each of said plurality of bypass paths including an externally controlled variable flow orifice valve which has an orifice area variable in response to a second predetermined variable different from said first predetermined variable;
   means for detecting said second predetermined variable and generating an output signal; and
   controlmeans for varying said orifice area of each of said externally controlled variable flow orifice valves in response to said output signal.

* * * * *